Oct. 16, 1923.

C. F. KLUTH

GRAIN SAVER

Filed Feb. 2, 1922

1,471,269

WITNESSES

INVENTOR
C. F. Kluth,
BY
ATTORNEYS

Patented Oct. 16, 1923.

1,471,269

UNITED STATES PATENT OFFICE.

CHARLES F. KLUTH, OF WIBAUX, MONTANA.

GRAIN SAVER.

Application filed February 2, 1922. Serial No. 533,626.

*To all whom it may concern:*

Be it known that I, CHARLES F. KLUTH, a citizen of the United States, and resident of Wibaux, in the county of Dawson and State of Montana, have invented certain new and useful Improvements in Grain Savers, of which the following is a specification.

This invention relates to harvesting machines and more especially to an attachment or grain saver for self-binding grain binders and other harvesting machines such as headers, binders, etc.

The object of the invention is to provide in combination with the platform canvas or apron, or endless conveyor and elevator canvases or endless conveyors leading upwardly therefrom, a grain saver or attachment, so as to catch all grain that falls between the platform or horizontally traveling and grain receiving canvas or conveyor and the elevator canvases or conveyors and onto the ground.

A further object of the invention as set forth, is in addition to catching and saving loose or shelled grain which falls between the platform and elevator conveyors, and all grain or weed seeds rubbed out between the elevating canvases or conveyors, and falling down through the opening between said horizontal and elevating canvases or conveyors, to particularly and primarily catch and save all whole grain which falls between the platform and elevator conveyors, and which would otherwise drop onto the ground and be lost and wasted, this applying especially to short grain and broken off heads, so that the device is rendered especially adaptable for use in localities, such as the western section of this country, where the grain is short and considerable is therefore wasted.

With these and other objects in view, the invention has for its further object to provide a grain saver or grain saving attachment of the class referred to which will catch all whole or unshelled grain which falls between the platform conveyors and the elevator and causes the same to be carried back to the outer end of the platform at the bottom of the binder, where it is turned back on the conveyor and mixed with the other grain, so as to be carried up and discharged with it, as well as to catch grain that falls at the outer end of the platform, and it consists in certain pecularities of construction, novel arrangement and operation of the various parts thereof as will be hereinafter more fully set forth and specifically claimed.

In the accompanying drawings.

Figure 1:
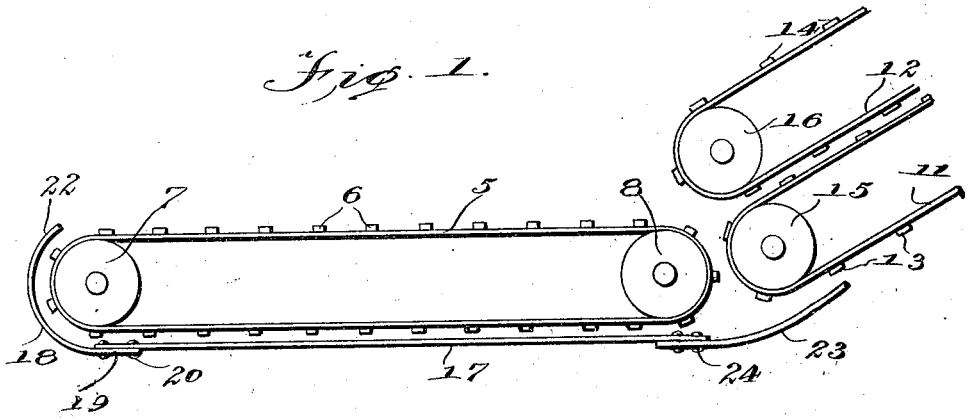
Figure 1 is a sectional side elevation, showing the improved grain saver or saving attachment applied to a binder and the relation thereof to the grain receiving or platform canvas or conveyor and the elevating canvases or conveyors leading upwardly therefrom.

Referring to the drawings in detail, in which for purposes of illustration is shown the preferred embodiment of the invention and in which like reference characters designate corresponding parts throughout the several views, the numeral 5 designates the endless grain receiving or horizontally operating platform canvas or conveyor of a binder or the like, as heretofore referred to and which is or may be provided with a number of slats or cleats 6 in the ordinary manner. This canvas or conveyor 5 is extended over rollers 7 and 8, which rollers are transversely journaled on the front part 9 and the rear part 10 of a suitable frame, such as the platform frame of the binder and adapted to be driven in the usual or any preferred manner common in the art.

Figure 2:
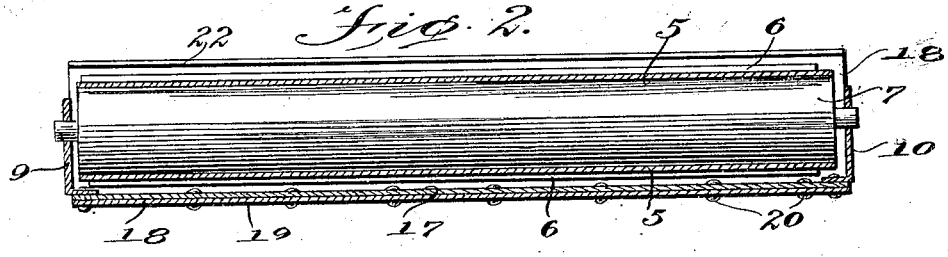
Figure 2 is an enlarged transverse vertical sectional view across the horizontal or grain receiving canvas or conveyor and platform and showing the front and rear parts of the platform frame.
Figure 3:
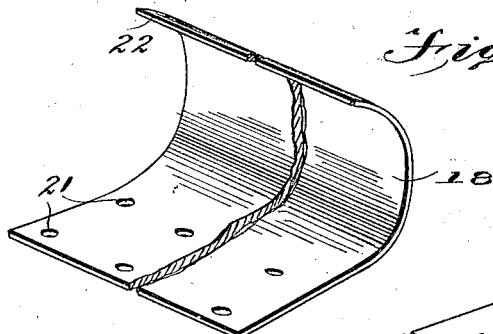
Figure 3 is a broken perspective view showing a part of the improved attachment applied at the dividing board and receiving end of the platform canvas or conveyor.
Figure 4:
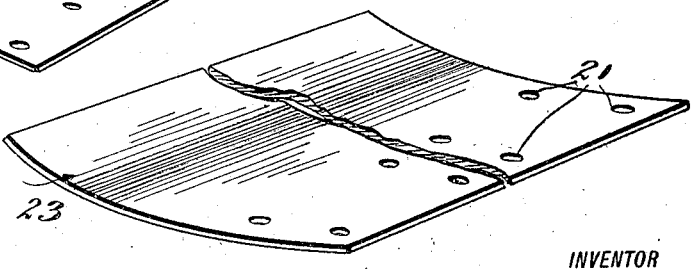
Figure 4 is a similar view of another part of the attachment applied at the inner end of the platform bottom and canvas and between the latter and the elevator canvases or conveyors.

The elevating canvases or endless conveyors, a part of each of which is shown in Figure 1 of the drawings, are designated by the numerals 11 and 12 and said canvases or conveyors are or may be provided with similar cross-wise extending cleats or slats 13 and 14 corresponding to the cleats or slats 6 of the canvas or conveyor 5. The endless canvas or conveyor 11 is extended over rollers 15 only one of which is shown, while the endless canvas or conveyor is extended over rollers 16, only one of which also is shown, said rollers 15 and 16 being transversely journaled on the front and rear parts of the usual and suitable frame extended in alignment with the frame members of the horizontally operating canvas or conveyor, as usual, the adjacent and coacting elevating canvases or conveyors forming the elevating carrier of the binder. It will also be observed that the frame of the binder platform, and particularly the front and rear parts thereof, provide upstanding flanges, as more particularly illustrated in Figure 2 of the drawing so as to receive and support the platform bottom or floor member 17 of imperforate formation and disposed in close proximity to the lower lap of the canvas or conveyor 5 and the slats or cleats 6 thereof.

Disposed at the receiving end of the conveyor or canvas 5 and at the divider board end of the platform is a substantially semi-circular shield or plate 18 of the full width of the platform and having a straight or rectilinear portion 19, flattened to engage and fit against the adjacent end of the platform bottom 17 to which it is rigidly secured, preferably in overlapped relation by suitable fastening means such as bolts, rivets or the like 20, the adjacent outer end of the platform or bottom thereof and said shield or plate 18 at the straight portion 19 being provided with coacting apertures 21 for this purpose. It will be seen from Figures 1 and 2 of the drawing that the semi-circular shield or plate 18 extends up and around the roller 7 and the canvas or conveyor 5 together with its slats 6 trained thereon and in spaced relation thereto like the bottom 17, while the free end 22 extends upwardly and sufficiently over the slatted canvas or conveyor to insure the carrying of material such as short grain and broken off heads, over and onto the top lap of the conveyor.

At the inner end of the platform is disposed a slightly curved or arcuate guard plate 23, detachably or otherwise rigidly secured to said end in a manner corresponding to the method of attachment of the guard or plate 18 to the outer end, as designated at 24. The guard or plate 23 extends entirely across the width of the bottom of the platform and the conveyors and underlies the space between the horizontal or grain receiving canvas or conveyor 5 and the elevating canvases or conveyors of the binders 11 and 12 constituting the elevating carrier thereof, said arcuate guard or plate 23 curving upwardly at the inner or rear end so as to lie beneath the elevating carrier and prevent any of the loose whole grain or the shelled grain from dropping out.

Thus in the operation of the device, it will be seen that any grain, including whole grain, that is, short grain and broken off heads, which as is well known to those conversant with the operation of self binding grain reapers and the harvesting of grain, especially where the grain is short, instead of dropping between the endless conveyor or canvas 5 and the divide board will fall upon the shield or plate 18 and as the conveyor 5 operates, will be caught by the slats 6 and carried over on the top portion or lap of said conveyor, all grain that would otherwise fall at the outer end of the platform canvas or conveyor and drop to the ground being thereby caught and returned or discharged upon the elevating carrier. In addition, all grain that falls between the conveyor 5 and the conveyors 11 and 12 of the elevating carrier will drop upon the shield or plate 23 instead of being permitted to fall or drop to the ground and be wasted and will then be carried back by the lower lap of the conveyor 5 and between the same and the platform bottom 17 until it reaches the semi-circular guard or plate 18, when it will be lifted or carried over on top of the canvas or conveyor 5 to again be fed to the elevating carrier.

In the operation of self binding grain reapers and the harvesting of grain, the first and most serious loss therein occurs when the reel hits the head of the ripened grain, thus shelling the wheat or grain onto the horizontal or platform canvas or conveyor, then as the grain is carried back by said canvas or conveyor, a considerable quantity shells out between it and the elevating canvases or conveyors and falls back between said canvases onto the ground. It will be seen that the present invention not only overcomes this first and most serious loss of grain, that is, shelled or loose grain, in addition to catching the seed of weeds, foreign matter and chaff and preventing the dissemination of said seed, but also prevents the dropping through and wasting of the whole grain, especially short grain and broken off heads, which would otherwise be wasted, thus especially adapting the device for use in the western section of this country where the grain is short and considerable quantity of grain is thereby wasted. This is due to the fact that the whole grain is carried back to the outer end of the platform where it is turned back on the conveyor and mixed with the other grain so as to be carried up the elevating carrier with it, in addition to catching the grain which would fall at the outer end of the platform and between the canvas or conveyor and the divider board. In practice, the shields or plates 18 and 23 are preferably made of heavy sheet material, such as iron, as long as the platform is wide, so as to extend entirely across or the full width of the platform and conveyor, the shield or plate 18 being preferably about eight inches wide in practice and the shield or guard plate 23 about twelve inches wide, although it is to be understood that the material, proportions, securing means and the arrangement of parts as described may be modified by me without departing from the scope and spirit of the invention, so long as the same does not depart from the scope of the device as claimed.

Having thus fully described my invention what I claim as new and desire to secure by Letters Patent is:—

1. A grain saving attachment for grain conveyors consisting of a shield mounted in fixed relation to the inner end of the binder platform bottom beneath the space between the grain receiving conveyor and the grain elevating conveyors of the binder and curved upwardly, and a substantially semi-circular shield mounted in fixed relation to the outer end of said platform bottom and extending upwardly and partly over the grain receiving conveyor, as and for the purposes specified.

2. A grain saver for grain conveyors and the like having a grain receiving conveyor and grain elevating conveyors in spaced relation thereto, together with the platform bottom beneath the grain receiving conveyor and in close proximity thereto, comprising a guard plate of arcuate formation detachably secured in fixed relation to the inner end of said platform bottom and underlying the space between the grain receiving and the grain elevating conveyors to catch the loose whole grain dropping through said space, and a substantially semi-circular shield detachably mounted in fixed relation to the outer end of the platform bottom and extending upwardly and around the adjacent end of the receiving conveyor and in spaced relation thereto concentric with the adjacent roller periphery and its axis.

3. A grain saver for grain conveyors and the like having a grain receiving conveyor and elevator conveyors in spaced relation thereto, together with a platform bottom beneath the grain receiving conveyor and in close proximity thereto, comprising a guard plate of arcuate formation detachably secured in fixed relation to the inner end of said platform bottom and underlying the space between the grain receiving conveyor and the grain elevating conveyors to catch the loose whole grain dropping through said space, and a substantially semi-circular shield detachably mounted in fixed relation to the outer end of the platform bottom and extending upwardly and around the adjacent end of the receiving conveyor and in spaced relation thereto, said guard and shield extending from the platform bottom in substantially the same plane therewith.

4. In a grain saver for grain conveyors or the like, the combination with the usual grain receiving conveyor and the usual elevating carrier disposed in spaced relation to the inner end of the grain receiving conveyor; of a platform bottom disposed beneath and in close proximity to the lower lap of the grain receiving conveyor and having a guard plate at the inner end thereof of continuous curvature extending inwardly and upwardly beneath the elevating carrier said platform bottom also having at its outer end and extending therefrom a substantially semi-circular shield adapted in conjunction with the grain receiving conveyor to cause the whole grain, including short grain and broken off heads dropping through the space between grain receiving conveyor and the elevating carrier and onto the guard, and carried back by said grain receiving conveyor upon said platform bottom, to be returned to the top of the grain receiving conveyor together with any grain falling at the outer end of the platform and between said conveyor and the usual divide board of the platform of the binder.

5. In a grain saver for grain receiving conveyors, the combination of a suitably driven grain receiving conveyor mounted for movement and operating horizontally, an elevated carrier spaced from the inner end of said receiving conveyor and comprising upper and lower cooperating conveyors disposed to receive the grain from said conveyor, a platform bottom disposed beneath the receiving conveyor and in close proximity to the lower lap thereof, means for receiving and returning grain heads into the path of the receiving conveyor and located adjacent to the inner end of the elevating carrier whereby said grains will be returned to the receiving end of the first-mentioned conveyor, and a shield extending from the outer end of the platform bottom and partially around the adjacent end of the receiving conveyor for directing the returned grains upon the receiving conveyor.

6. A grain saving attachment for grain receiving conveyors comprising in combination, a platform bottom, a shield plate mounted in fixed relation to the outer end of the platform bottom beneath the grain receiving canvas or conveyor and curved upwardly and partly over the grain receiving canvas, as and for the purpose specified.

CHARLES F. KLUTH.